(12) United States Patent
Wheeler et al.

(10) Patent No.: US 7,995,054 B2
(45) Date of Patent: *Aug. 9, 2011

(54) IDENTIFICATION OF EDGE REGIONS FROM 3D POINT DATA

(75) Inventors: Mark Damon Wheeler, San Ramon, CA (US); Richard William Bukowski, Orinda, CA (US); Jonathan Apollo Kung, San Francisco, CA (US)

(73) Assignee: Leica Geosystems AG, Heerbrugg (CH)

( * ) Notice: Subject to any disclaimer, the term of this patent is extended or adjusted under 35 U.S.C. 154(b) by 1291 days.

This patent is subject to a terminal disclaimer.

(21) Appl. No.: 11/285,474

(22) Filed: Nov. 21, 2005

(65) Prior Publication Data

US 2007/0130239 A1    Jun. 7, 2007

(51) Int. Cl.
| | |
|---|---|
| *G06T 15/00* | (2006.01) |
| *G06T 17/00* | (2006.01) |
| *G01B 9/00* | (2006.01) |
| *G01B 17/00* | (2006.01) |
| *G01B 19/00* | (2006.01) |
| *G01B 7/00* | (2006.01) |
| *G01B 15/00* | (2006.01) |

(52) U.S. Cl. ........ 345/419; 345/420; 702/151; 702/152; 702/155

(58) Field of Classification Search .................. 345/619, 345/419, 420; 702/151–155
See application file for complete search history.

(56) References Cited

U.S. PATENT DOCUMENTS

| | | | |
|---|---|---|---|
| 4,662,222 A | 5/1987 | Johnson | |
| 5,027,281 A | 6/1991 | Rekow et al. | |
| 5,128,870 A | 7/1992 | Erdman et al. | |
| 5,251,184 A | 10/1993 | Hildebrand et al. | |
| 5,619,709 A | 4/1997 | Caid et al. | |
| 5,719,821 A | 2/1998 | Sallas et al. | |
| 5,794,178 A | 8/1998 | Caid et al. | |
| 5,850,289 A | 12/1998 | Fowler et al. | |
| 5,988,862 A * | 11/1999 | Kacyra et al. | .............. 703/6 |
| 6,041,147 A | 3/2000 | Mead | |
| 6,234,397 B1 | 5/2001 | He et al. | |

(Continued)

OTHER PUBLICATIONS

C. Briese, "Three-Dimensional Modelling of Breaklines from Airborne Laser Scanner Data," In: O. Altan (ed.): Proc. XXth ISPRS Congress, Istanbul, vol. XXXV, Part B/3(2004) ISSN 1682-1750; pp. 1097-1102.

(Continued)

*Primary Examiner* — Kee M Tung
*Assistant Examiner* — Robert Craddock
(74) *Attorney, Agent, or Firm* — Maschoff Gilmore & Israelsen

(57) ABSTRACT

An improved interface and algorithm(s) can be used to simplify and improve the process for locating an edge from a series of points in a point cloud. An interface can allow the user to select a hint point thought to be near an edge of interest, which can be used to generate an initial edge profile. An interface can allow the user to adjust the fit of the initial profile in cross-section, then can use that profile to generate a profile of the entire edge. A moving fit window can use a moving average to extend the edge and determine proper end locations. An interface then can display the results of the fit to the user and allow the user to adjust the fit, such as by adjusting the end points of the calculated edge. Such a process can be used to fit linear or curvilinear edges, and can fit a number of irregular shapes as well as regular shaped such as "v-shaped" edges.

23 Claims, 8 Drawing Sheets

U.S. PATENT DOCUMENTS

| | | | |
|---|---|---|---|
| 6,300,965 B1 | 10/2001 | Sowizral et al. | |
| 6,476,803 B1 | 11/2002 | Zhang et al. | |
| 6,615,221 B2 | 9/2003 | Beygelzimer et al. | |
| 6,922,234 B2 * | 7/2005 | Hoffman et al. | 356/141.1 |
| 6,968,299 B1 * | 11/2005 | Bernardini et al. | 703/2 |
| 6,996,505 B1 | 2/2006 | Edelsbrunner et al. | |
| 7,020,316 B2 | 3/2006 | Wei et al. | |
| 7,023,432 B2 | 4/2006 | Fletcher et al. | |
| 7,251,637 B1 | 7/2007 | Caid et al. | |
| 7,277,197 B2 | 10/2007 | Yoshida | |
| 7,394,482 B2 * | 7/2008 | Olschewski | 348/79 |
| 7,400,770 B2 | 7/2008 | Keaton et al. | |
| 7,509,241 B2 | 3/2009 | Guo et al. | |
| 2005/0128197 A1 | 6/2005 | Thurn et al. | |
| 2007/0110338 A1 | 5/2007 | Snavely et al. | |

OTHER PUBLICATIONS

T-T. Chung et al., "An Automatic Data Segmentation Method for 3D Measured Data Points," *AMTE 2002, IEEE/ASME International Conference on Advanced Manufacturing Technologies and Education in 21st Century*, Aug. 11-12, 2002, Chia-Yi, Taiwan, Papers No. C168, 8 pages in length.

U.S. Appl. No. 11/285,582, mail date Jan. 25, 2010, Office Action.

U.S. Appl. No. 11/285,582, mail date Jul. 13, 2010, Office Action.

Notice of Allowance mailed Sep. 7, 2010 in connection with U.S. Appl. No. 11/285,582.

* cited by examiner

IDENTIFICATION OF EDGE REGIONS FROM 3D POINT DATA

TECHNICAL FIELD OF THE INVENTION

The present invention relates to the identification of points that correspond to a particular object, such as points from a data set that lie on a surface of interest as well as the generation of a model or representation of that object.

CROSS-REFERENCE TO RELATED APPLICATIONS

The present application is related to, filed Nov. 21, 2005, entitled: "IDENTIFICATION OF OCCLUDED EDGE REGIONS FROM 3D POINT DATA," hereby incorporated herein by reference.

BACKGROUND

There are many ways to construct a computer model of a physical structure, such as by scanning the structure and generating a virtual model from the resultant scan data. These techniques become more complicated for large structures, which can have very complex surfaces due to the amount of equipment, fixtures, and other objects that could be present in the scan.

One technique for constructing these computer models begins by laser scanning the structure. In the laser scanning process, a laser beam scans across a view that encompasses the structure of interest. The scanning device measures a large number of points that lie on surfaces within an unobstructed line of sight of the scanning device. Each scan point has a measured location in 3D space, to within some measurement error, that typically is recorded relative to a point (x,y,z) in the local coordinate system of the scanner. The resulting collection of points is often referred to as one or more point clouds, where each point cloud can include points that lie on many different surfaces in the scanned view. For example, a scan taken at a petroleum refinery may include a point cloud that has points that correspond to pipes, elbows, valves, pumps, and structural steel members. Once the 3D data for the points in the scan have been collected, the data typically are registered to create a single data set including all the scan points. This single set then can be processed to generate a computer (virtual) model of the structure using techniques known in the art.

It often is desirable to find features such as edges that are contained in the point cloud. Points that lie near an edge can be grouped together, then processed by a prior-art fit procedure to construct a geometric model of the edge. This can be difficult using two-dimensional representations of 3-D data, and often requires a number of manual steps for the user, such as selecting an area thought to contain an edge, manually rotating a view of the edge in order to view a cross-section of the edge, drawing a shape thought to correspond to the edge, and then allowing the computer or processor to attempt to find the edge corresponding to that shape and vertex. Typically, a fit procedure generates a geometric primitive of the edge of interest from the selected surface points. Once the primitive has been generated, fit statistics are reviewed. Frequently, the fit statistics fall below acceptable levels due to the inadvertent inclusion of points not on the surface of interest. When this occurs, the user must perform additional manual segmentation, drawing, or scaling steps to remove these spurious points. As a result, this procedure for generating a computer model of an edge from 3D point data is a time-consuming and error-prone process. A step-wise approach taken by such systems to locate the edge also often overshoots or undershoots the ends of the edge due to the ends of the edge not corresponding to an end of a corresponding step. Such approaches also typically are not able to follow irregular shapes or non-linear edges, or to follow edges where there are gaps or spurious data points along the edge.

Another problem with existing approaches is that point-by-point methods are forced to use full data density, even if not required by the application. In real scanner data collection there often are significant variations in the density of point data across a scanned surface, and existing approaches do not deal well with variable density. There is no inherent sense of scale to guide point decimation. Derivative methods, including local curvature methods and methods depending on normal vectors, tend to degrade as the point spacing becomes small relative to the measurement noise in the data. Further, many existing algorithms require an estimate of the surface normal vector at each data point, which can be computationally intensive (especially on unordered data) and sensitive to point density, noise, and occlusions.

DETAILED DESCRIPTION

Systems and methods in accordance with embodiments of the present invention overcome deficiencies in existing approaches by changing the ways in which points lying on an edge of interest are identified. In particular, various embodiments can utilize an improved interface and improved algorithms to identify points lying near an edge of interest and model those points into a continuous edge model. In one embodiment, a user specifies only a single seed point along the edge and approves or alters an automatically generated initial edge profile. From this point and initial edge profile, the system can determine an initial edge portion that corresponds to that point and profile, then extend that portion to model the entire edge of interest. The user then has the ability to change factors such as the scale and endpoints in order to adjust the calculated edge model as necessary. Various embodiments provide for variable length lookaheads along the length of a curve, which can be used with a moving window termination detection algorithm to avoid problems with varying point density along the curve.

Figure 1:
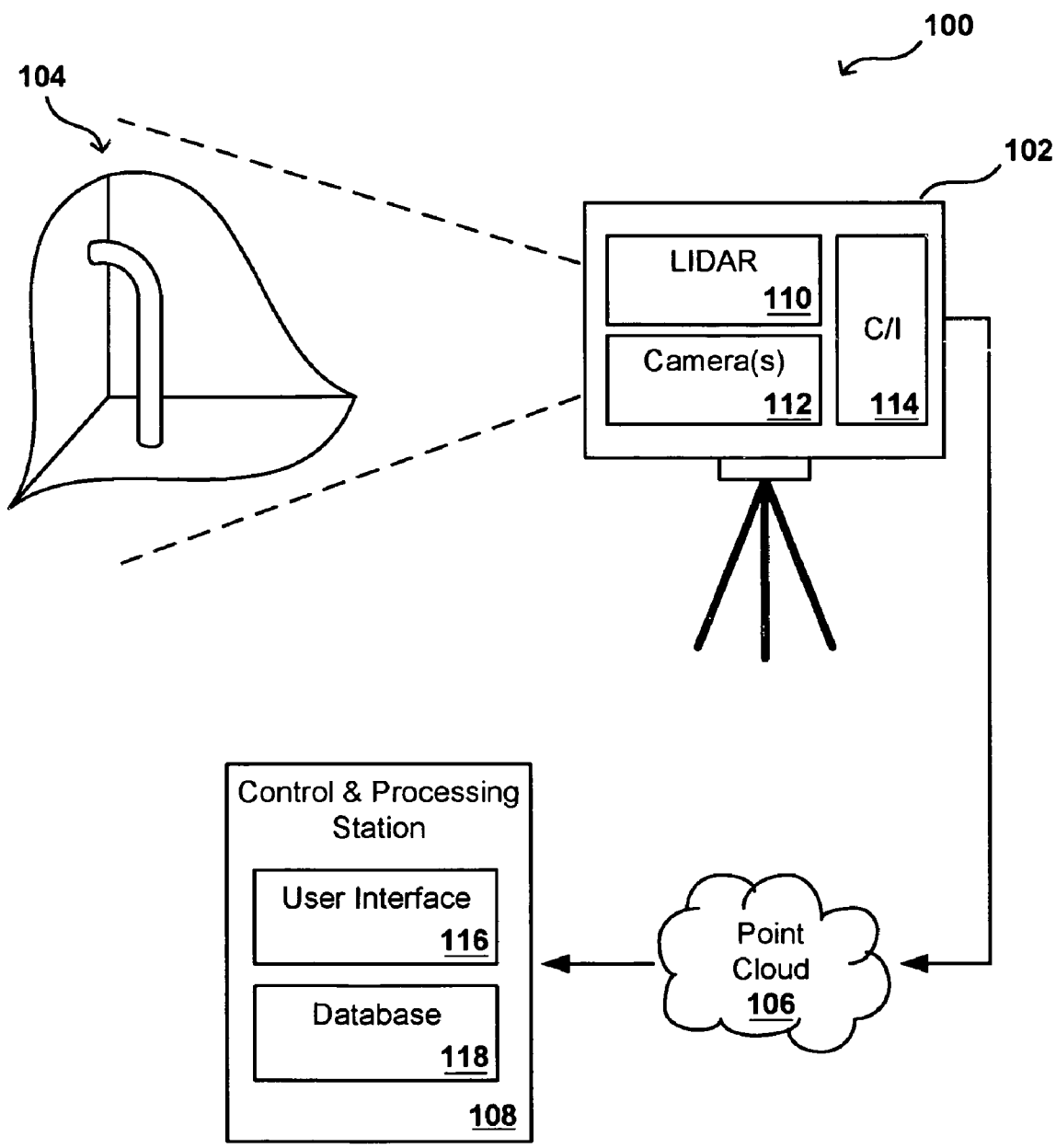
FIG. 1 is a diagram of a scanning LIDAR system that can be used to capture point data in accordance with one embodiment of the present invention.

Data relating to a physical object can be captured in any of a number of different ways, such as using a scanning LIDAR system as described, for example, in U.S. Pat. No. 5,988,862, filed Apr. 24, 1996, entitled "INTEGRATED SYSTEM FOR QUICKLY AND ACCURATELY IMAGING AND MODELING THREE DIMENSIONAL OBJECTS," which is hereby incorporated herein by reference. An example of a LIDAR system 100 used to capture data is shown in FIG. 1. This system utilizes a Field Digital Vision (FDV) module 102 that includes a scanning sensor for scanning an object 104, such as a pipe positioned in a corner of a room. The scanning sensor also can sense the position in three-dimensional space of selected points on the surface of the object 104. The FDV module 102 generates a point cloud 106 that represents the sensed positions of the selected points. The point cloud 106 also can represent other attributes of the sensed positions, such as reflectivity, surface color, and texture, where desired.

A control and processing station 108 interacts with the FDV 102 to provide control and targeting functions for the scanning sensor. In addition, the processing and control station 108 can utilize software to analyze groups of points in the point cloud 106 to generate a model of the object of interest 104. A user interface 116 allows a user to interact with the system, such as to view a two-dimensional (2D) representation of the three-dimensional (3D) point cloud, or to select at least one seed point from the cloud as will be discussed later herein. The processing station can include any appropriate components, such as standard computer and/or processing components. The processing station also can have computer code in resident memory, on a local hard drive, or in a removable drive or other memory device, which can be programmed to the processing station or obtained from a computer program product such as a CD-ROM or download signal. The computer code can include instructions for interacting with the FDV and/or a user, and can include instructions for undertaking and completing any modeling and/or scanning process discussed, described, or suggested herein.

The FDV 102 can include a scanning laser system (LIDAR) 110 capable of scanning points of the object 104, and that generates a LIDAR data signal that precisely represents the position in 3D space of each scanned point. The LIDAR data signal for the groups of scanned points can collectively constitute the point cloud 106. In addition, a video system 112 can be provided, which in one embodiment includes both wide angle and narrow angle CCD cameras. The wide angle CCD camera can acquire a video image of the object 104 and provides to the control and processing station 108, through a control/interface module 114, a signal that represents the acquired video image.

The acquired video image can be displayed to a user through a user interface 116 of the control and processing station 108. Through the user interface 116, the user can select a portion of the image containing an object to be scanned. In response to user input, the control and processing station can provide a scanning control signal to the LIDAR 110 for controlling the portion of the surface of the object that should be scanned by the LIDAR. More particularly, the scanning control signal can be used to control an accurate and repeatable beam steering mechanism that steers a laser beam of the LIDAR 110. A measurement element of the video system 112 can capture the intensity of the laser returned from each laser impingement point, while a CCD camera or other video element can capture any desired texture and color information, this captured information being provided to the control and processing station 108. The control and processing station can include a data processing system (e.g., a notebook computer or a graphics workstation) having special purpose software that, when executed, instructs the data processing system to perform the FDV 102 control and targeting functions, and also to perform the model generation functions discussed elsewhere herein. Once the object has been scanned and the data transferred to the control and processing station, the data and/or instructions relating to the data can be displayed to the user. Alternatively, the user can select instructions before or during the LIDAR scan. If multiple scans are taken, these data sets can be combined or registered to form a single data set or point cloud as known in the art. After a single data set has been obtained, methods in accordance with various embodiments of the present invention can be used to process the data.

A process in accordance with one embodiment of the present invention presents an interface through which a user can more easily determine specific edges using a two-dimensional representation of a point cloud. The use of the term "edge" herein refers generally to any discontinuity, shape, or other definable point that can be said to trace out or extend in a linear or curvilinear fashion. The edge does not have to be a "v-groove" edge as would occur when two planes meet at an angle, such as a 90° angle, but can include complex, rounded, or other shapes that extend over a distance so as to define a linear or curvilinear path. For example, an edge could be a rounded corner of a street curb, a complex edge of an I-beam, a railroad rail, or a "top" edge of a pipe extending over a given distance. While tools exist that can fit objects in straight segments, it can be desirable to have a tool that is flexible enough to fit straight segments while also providing the ability to fit complex segments of varying curvature (i.e., shape) and length.

Figure 2:
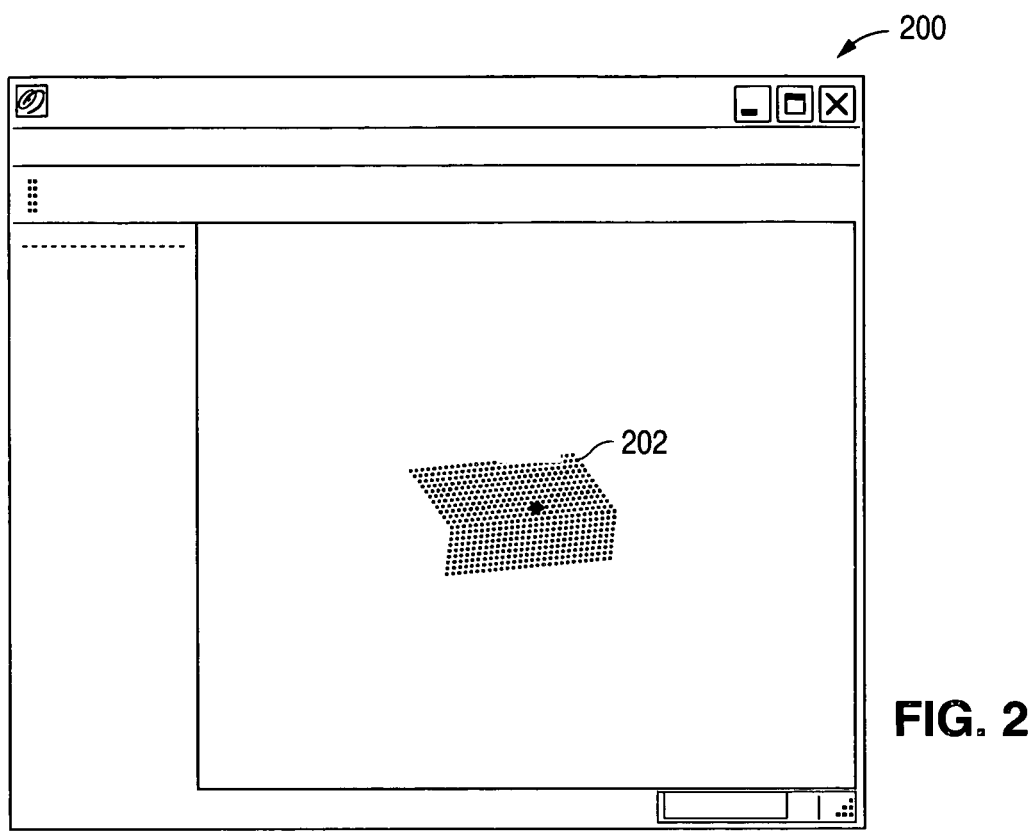
FIG. 2 is a view of a user-selected seed point in accordance with one embodiment of the present invention.

In an exemplary interface, a two-dimensional representation 200 of a point cloud, or a portion thereof, is displayed to a user as shown in FIG. 2. This example shows only a point cloud corresponding to an area near an edge, but it should be understood that the point cloud could include data for a complex array of shapes, of which the edge of interest is only one of a number or possible features that could be located, fit, and/or modeled. This display can be a window or panel displayed on a computer screen or the like, and can present the point cloud as a series of pixels on the display. The number of points can be scaled where the number of points in the point cloud would approach or exceed the resolution of the display device, such as is described in U.S. patent application Ser. No. 11/076,220, filed Mar. 9, 2005, which is hereby incorporated herein by reference. From this representation, the user can select a seed point 202, or "hint" point, that the user determines to lie on or near an edge of interest. The user can select at least one seed point from the point cloud using an appropriate selection device, such as a computer mouse or stylus as known in the art. In some embodiments it would be desirable for the user to select a point along the edge that is in a portion of the point cloud having sufficient resolution around the edge to be able to clearly make out the edge, such that the point might be more representative of the actual position of the edge and the user can unambiguously tell the closest edge to the point. Sufficient resolution can vary by factors such as the specific shape of the edge in question, nearby edges, and character and angle of the scan.

It also can be desirable in some embodiments to allow the user to select multiple hint points, such as before and/or during the edge determination process to guide or redirect the edge fitting routine. There can be several advantages to using multiple hint points. For example, the system might generate initial edge direction determinations for each hint point, then determine whether those directions intersect (within some margin of error). If the directions do not intersect, the system can attempt to determine different initial edge directions that do intersect. Further, a user may wish to select an additional hint point on the opposite site of a gap in the point cloud, area of noise, or any other discontinuity that the user thinks might cause a problem with edge detection. If the system starts growing the edge model from a hint point and does not reach the other hint point before stopping, the system can know that it is necessary to attempt to connect the points along the edge. A user also may choose to select additional hint points where there is a bend, corner, dip, or other irregular shape along the edge that might cause the system to not grow the edge past that point. Selecting additional points also indicates that the system should not stop growing the edge until at least all the points are included in the model. For example, the user might select a first hint point somewhere in the middle of an edge, such as along a substantially linear portion where the edge detection is likely to accurately model the edge, then select a point at each end to help ensure that the system models the entire edge.

When the user selects a seed point, the processing system can select representative points in a localized 3D region of space near the seed point(s), such as by using spatial queries. A spatial query can request points in a localized 3D region of space, which can be limited by a maximum spatial density and/or a maximum point count. The region of space can be specified using a geometric bound, such as inside a ball, inside a cube, inside a convex polyhedron, or between two spheres. When a maximum point density is used, the density can provide a bound on the distance between the points returned by the query and those points that were filtered out. Such a bound also can ensure that the points being examined are representative of all the points in the region of interest.

Points around the selected seed point can be grouped into a consensus region. The points of the consensus region can be used to form a covariance matrix of those points using any appropriate technique known or used in the art for forming a covariance matrix. The covariance matrix then can be decomposed into eigenvectors, or the principal components ordered by decreasing eigenvalue. For scattered points the eigenvalues generally will all be of approximately the same magnitude, while for a structure that is linear (or at least substantially linear over a local/minimum range) one of the eigenvalues will be much greater than the other two eigenvalues, and for a structure that is planar (or at least substantially planar over a local/minimum range) one of the eigenvalues will be much less than the other two eigenvalues which will be of similar magnitude. Once the eigenvectors are found, one of the eigenvectors will correspond to the normal direction of the edge at or near the seed point. If normals are available in the dataset, the smallest eigenvector based on the collection of normals can be used, indicating the smallest spread in distribution of the normals in that direction. If normals are not available in the dataset, the largest eigenvector based on the collection of points can be used, indicating the largest spread in point distribution along that direction. The former case can generally give better results than the latter, but normals may not always be present for the dataset. In either case, the eigenvector in question can indicate the most likely direction of the edge.

Figure 3:
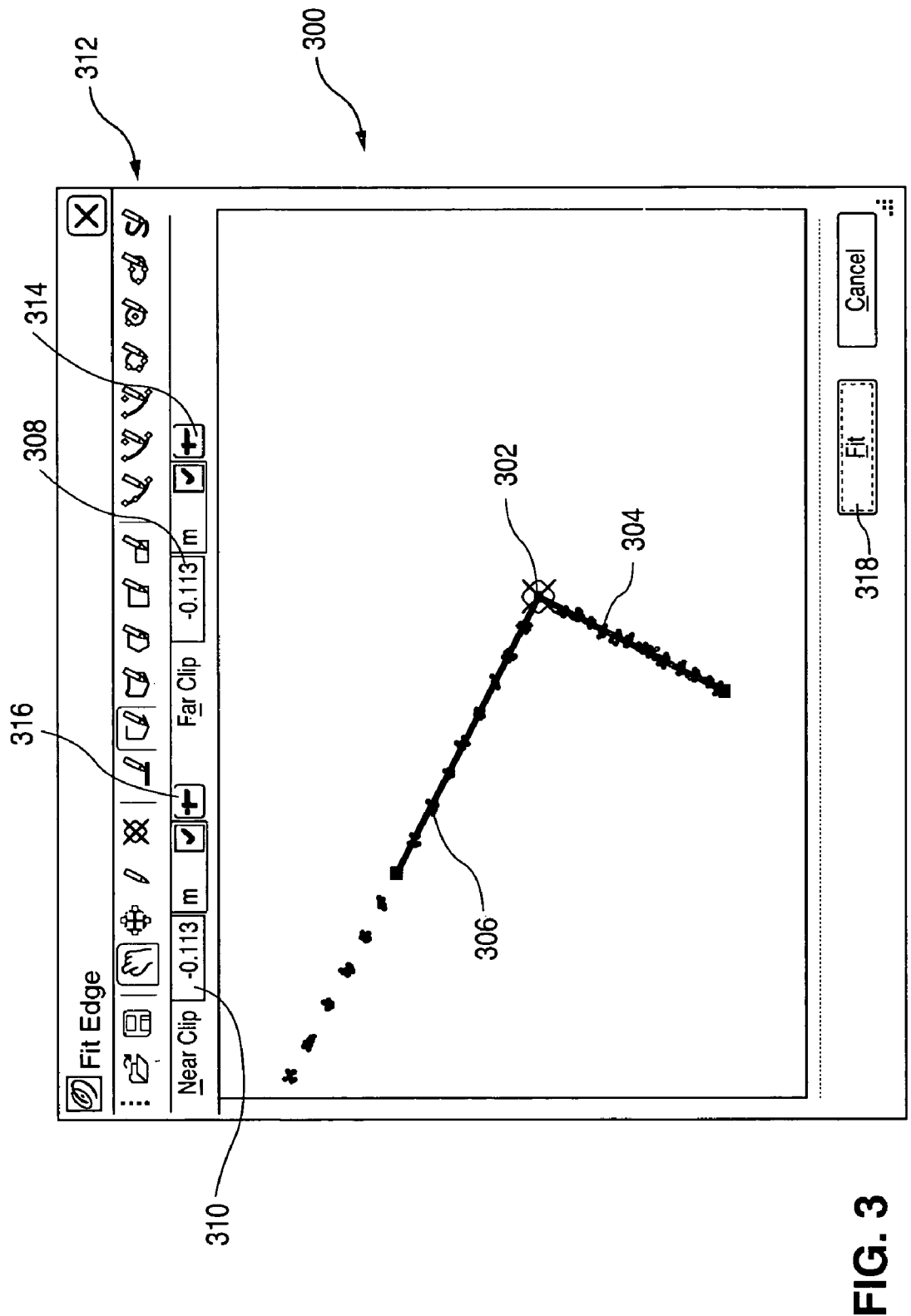
FIG. 3 is a view of an initial edge profile using the seed point of FIG. 2.

Once an edge location, shape, and direction have been predicted using the eigenvectors and covariance matrix, another view can be displayed to the user, such as in another window that pops up over the first window or in a panel separate from the panel containing the two-dimensional representation of the point cloud. This view 300, such as is shown in the example of FIG. 3, can show a representative cross-section of the edge to the user. The predicted edge shape and orientation can be used to align the representative points near the edge in order to display a representative cross-section to the user. The predicted edge location and direction also can be used to orient and zoom the view of the points and center (or otherwise position) the edge in the view. The level of zoom can be determined by a number of factors, such as the resolution or number of points contained in the representative set of points. A clip plane can be set to clip a slight distance in front of and behind the seed point, in order to provide a clean view of the edge.

Figure 11:
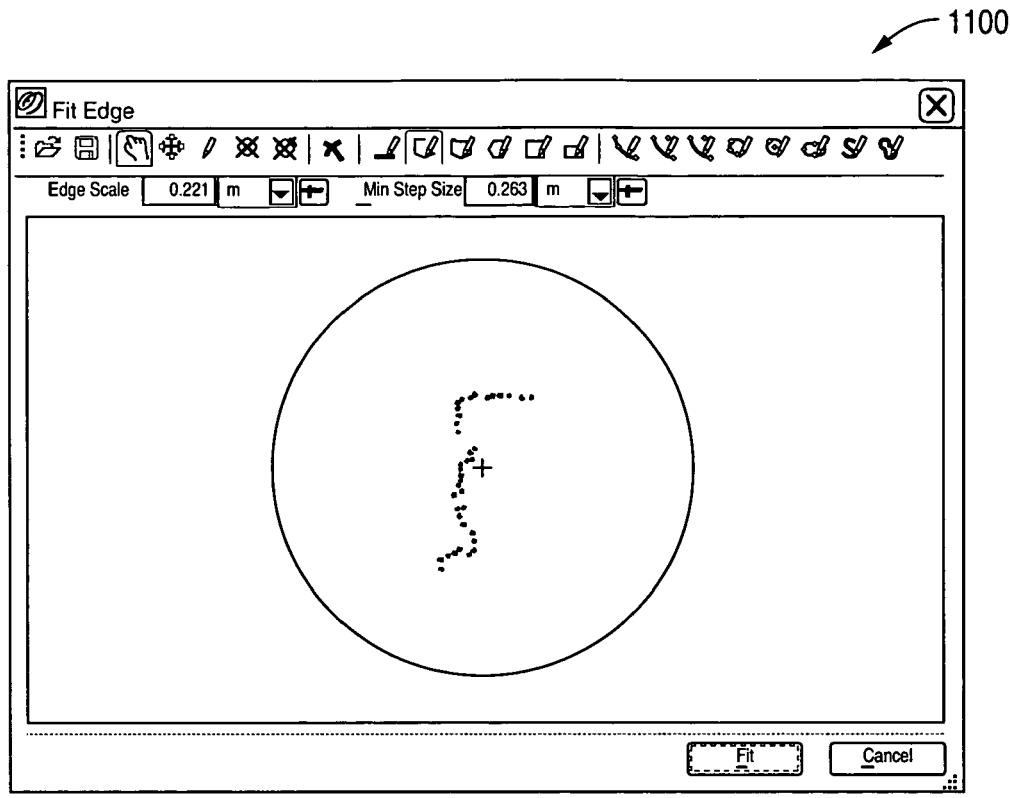
FIG. 11 shows a cross-section view of a set of points corresponding to a railroad rail in accordance with one embodiment of the present invention.
Figure 12:
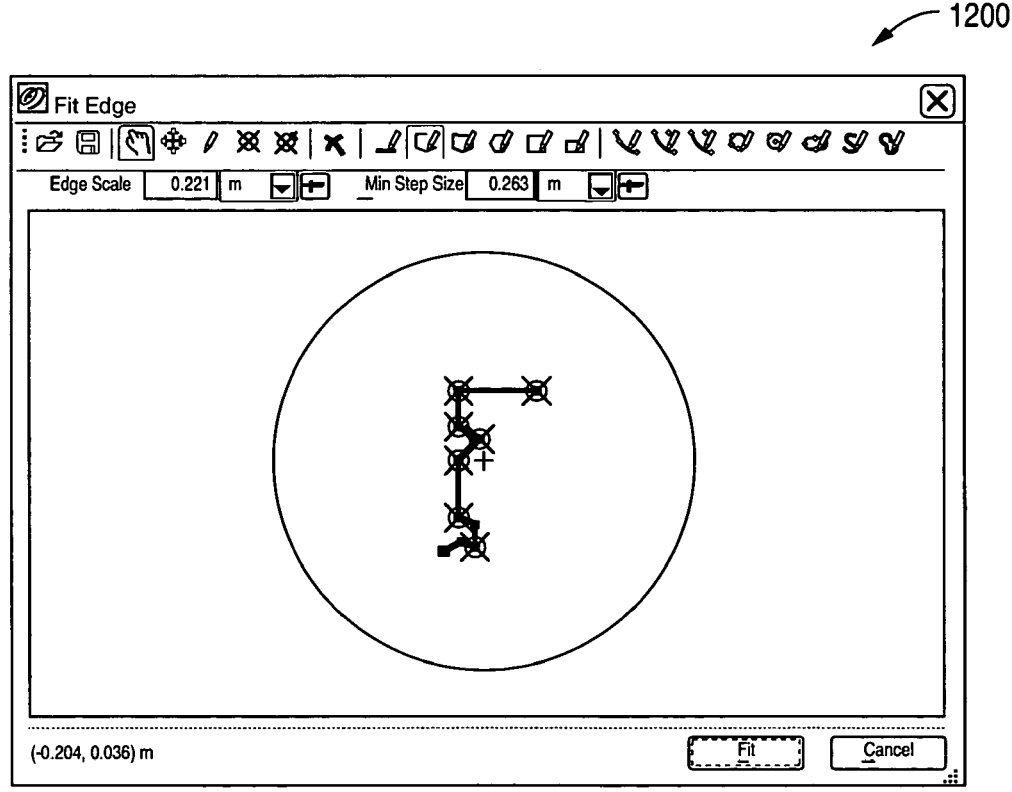
FIG. 12 shows an initial profile fit to the points of FIG. 11.

Once the points are selected and aligned to display a cross-section of the edge, the processing system can attempt to automatically generate an initial edge profile. In one embodiment, the processing system uses a fitting routine to determine the two strongest segments supported by the points in this cross-section. The processing system then can test to determine whether the segments, either in their present form or when extended, intersect near the seed point. If two such segments exist, these segments are used to create the initial edge profile. If two such segments do not exist, the closest match can be presented to the user, or the user can be allowed to generate the initial profile manually using line or segment creation software/hardware as known in the art. In one embodiment, a processing system automatically traces the best fit 2D profile with as many segments as are needed to adequately fit the 2D projection of the points in the region of interest. As an example, the profile of a railroad rail could be determined automatically. For example, FIG. 11 shows a view 1100 of a set of points corresponding to a railroad rail in cross-section. Using approaches and/or algorithms discussed below, an initial profile can be created, such as in the view 1200 of FIG. 12, that corresponds to the complex shape of the edge.

As shown in the view of FIG. 3, the user can see the cross-section view of the points, with a highlighted vertex 302 of the initial edge profile, along with a pair of segments 304, 306 determined to lie along the surfaces joined by the edge. While this initial determination might be highly accurate, it is possible that factors such as noise, resolution, or obstructions can cause the predicted profile to be less than accurate. In such case, the user can be allowed to adjust the initial profile. For example, the user can be allowed to move the vertex point 302 to a point that the user feels is more accurate of the position of the edge. The user also can be allowed to adjust the angle or shape of the segments to more accurately track the adjacent surfaces. The selection and movement of the vertices and segments can be accomplished using any appropriate mechanism, such as by selecting and dragging with a mouse as known in the art. The user also can be allowed to adjust the near and far clip planes. As shown in the view 300 of FIG. 3, the user can alter the position of the clip plane using dialog boxes 308, 310 (or other selection or entry mechanisms) for the near and far clip values. As can be seen, each dialog box also has an associated slider bar 314,316 allowing the user to more easily adjust each clip plane by sight. A number of icons 312 can be seen in the toolbar of the viewing window that allow the user to easily adjust, erase, and/or draw the positions of the segments 304, 306. The user also can be allowed to alter other aspects of the view and/or profile, such by rotating the view to provide a more accurate cross-section, increase or decrease the resolution, or control the zoom of the view. Once the user is satisfied that the initial profile is representative of the edge shape at that cross-section, the user can select a "fit" 318 or similar option. If no suitable profile is found, the user can select a "cancel" or other similar option to go back and select a different seed point from the view of FIG. 2.

Figure 10:
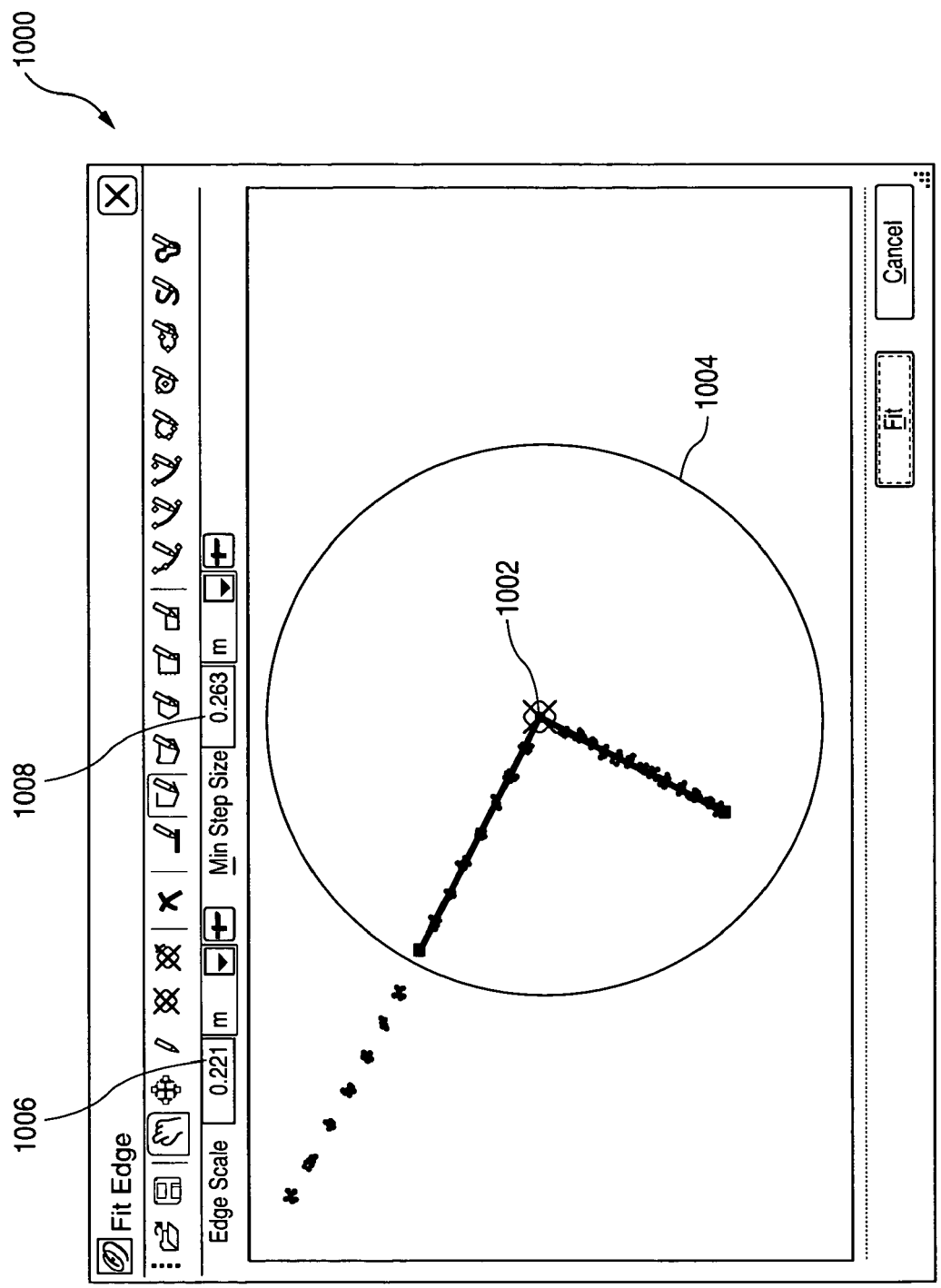
FIG. 10 shows another view of an edge profile using a seed point in accordance with one embodiment of the present invention.

An interface in accordance with another embodiment is shown in the view 1000 of FIG. 10. In this interface, a user does not alter clip planes, but instead can alter an Edge Scale 1006, which adjusts a radius of the sphere 1002 defining the region of interest about the seed point 1002. Points outside this sphere 1002 are not displayed and/or used to create the edge profile. Other embodiments could use other approaches such as clip planes, slice planes, and/or limit box(es) to adjust the set of visible points. The user also can set a minimum step size 1008 for the linear search along the length of the edge being fit. Setting this allows the user to fine tune the results, such as by using a smaller step size to go around curves or a larger step size to "hop" over sparse data or data with gaps.

When the user selects a fit option, the processing system can attempt to grow the edge profile in either direction along the length of the edge. A method such as a random sample consensus (RANSAC) method as known in the art can be used effectively to locate and model the edge, given the robust nature of such a method with respect to missing data. A RANSAC method uses a simple random sample consensus algorithm for robust fitting of models in the presence of many data outliers, and can avoid concerns with occlusions. Such a method also can be robust with respect to noise, including noise due to inaccurate measurements of points on the surface of interest, as well as accurate measurements of points on other surfaces. A RANSAC method can return a model of the edge that follows the local points within some specified deviation tolerance.

The use of a RANSAC method also allows for the easy processing of unordered data due to the registration of multiple data scans. Such an approach can take advantage of higher information in regions of overlap between multiple scans from different perspectives. Algorithms requiring data organized in grids or scanlines only can process data from a single view point. When two or more point data sets are registered, or stitched together, into a single cloud, there can be regions in which multiple clouds overlap. This overlap can provide information about connectivity that does not otherwise exist in any single view.

Figure 5:
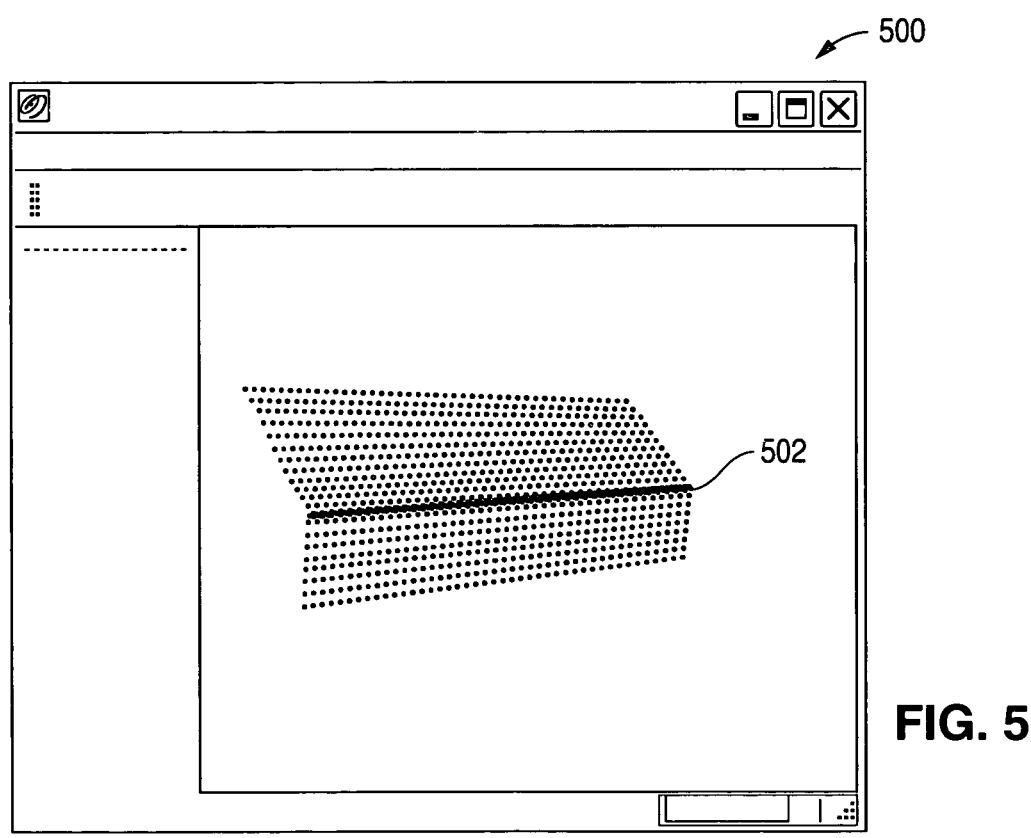
FIG. 5 is a view of a calculated edge profile based on the initial edge profile of FIG. 3.
Figure 4:
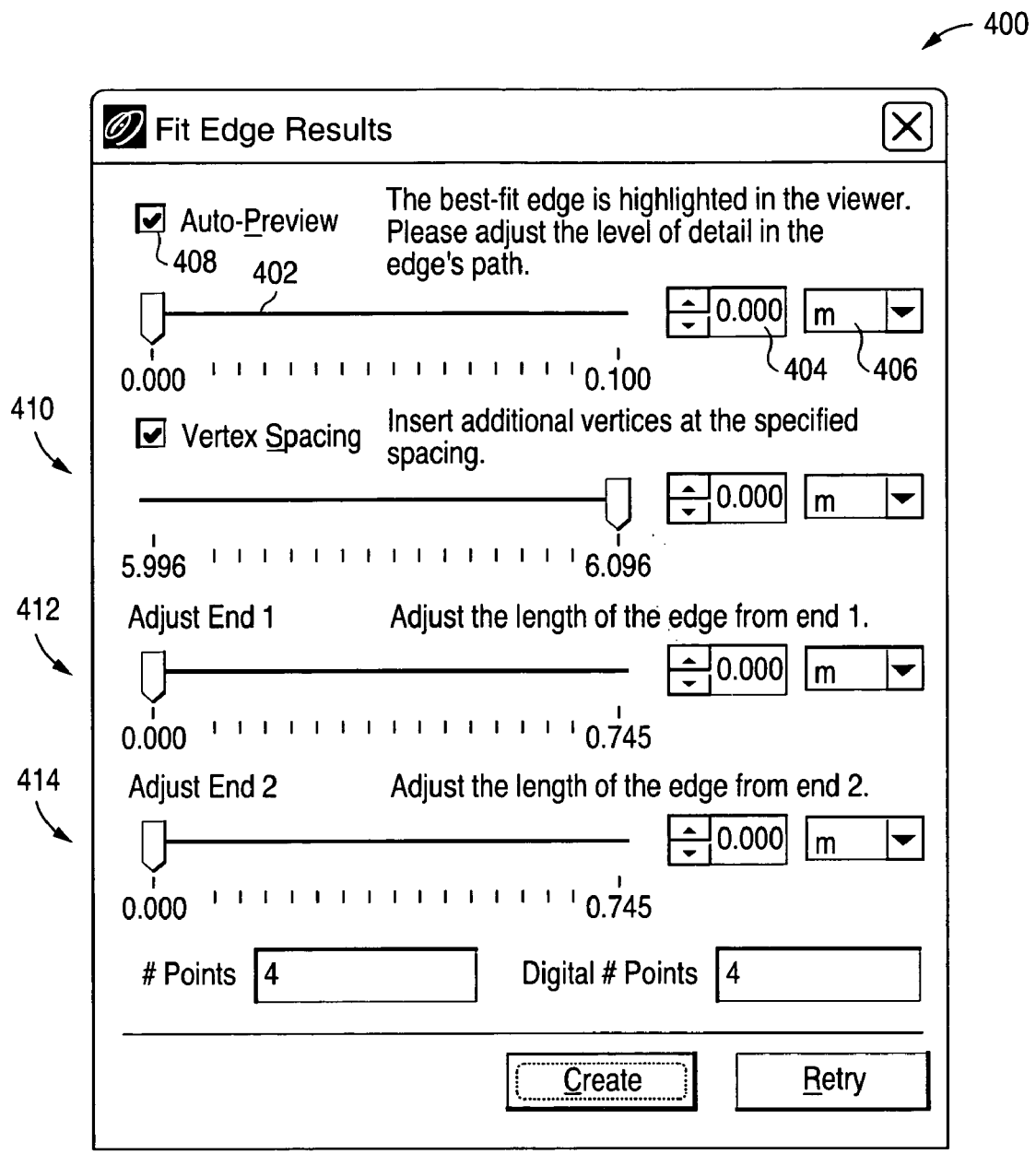
FIG. 4 is a panel showing controls that can be used to adjust the view of FIG. 5 in accordance with one embodiment of the present invention.

Once the first pass of the RANSAC (or other appropriate) fitting method is complete, a view 500 of the fit edge 502 and surrounding points can be displayed to the user, either in a new window/panel or in one of the previously used windows/panels. The view can be rotated as shown in the figure so that the edge is oriented perpendicular to the view direction, rather than along the view direction, so that the user can see the extent of the edge clearly, along with the relationship to the adjacent surfaces. Another panel 400, or set of controls, can be displayed to the user, such as is shown in FIG. 4. This panel 400 can allow the user to alter the view in FIG. 5. For example, the user can have the ability, through a slider 402 or scrolling dialog box 404, to adjust the level of detail in the path of the edge shown in the view 500. The level of detail here is the amount of perpendicular error allowed to be introduced in simplifying the edge by removing vertices. This can range from 0 (no error allowed, full detail) to some positive distance. Larger distances can allow for more error, and can have fewer segments of the polyline used for the edge (to a limit of having only one line segment). The user also can alter the units of detail using a drop-down menu box 406, and can select to auto-preview the changes using a checkbox 408 or other appropriate selection device.

The user also can have the option 410 of inserting additional vertices at spacing specified by the user, such as spacings representing 16'. Since the edge is represented as a polyline, vertices can be added in arbitrary places along the edge without changing the shape of the edge. For some applications, it can be useful to add polyline vertices at fixed, known intervals along the edge. This can be done through a slider, dialog box, or other appropriate selection device as described above. The user may wish to insert additional vertices, as many professions such as civil engineers like to see regular spacings on a model or plan. This option allows the insertion or selection of such points on the view. The view can be incorporated into a larger model, saved, printed, displayed, or otherwise used as known in the art. In other embodiments, the user may select to display only those vertices, without a solid line representing the edge.

Other options 412, 414 available to the user include the ability to adjust the end positions of the edge model. In many situations the RANSAC fitting will appropriately determine the ends of the edge. In other situations, such as where there is noise or extraneous data, the fit will either undershoot or overshoot the true end of the edge.

Figure 6:
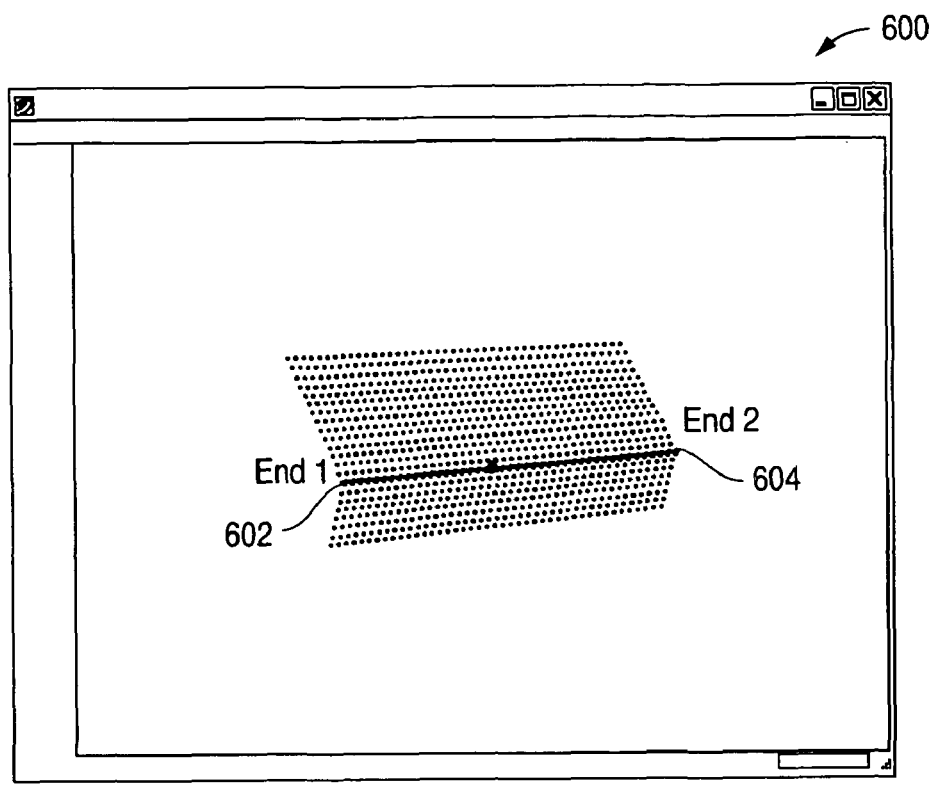
FIG. 6 is a view showing the calculated end points of the calculated edge profile of FIG. 5.
Figure 7:
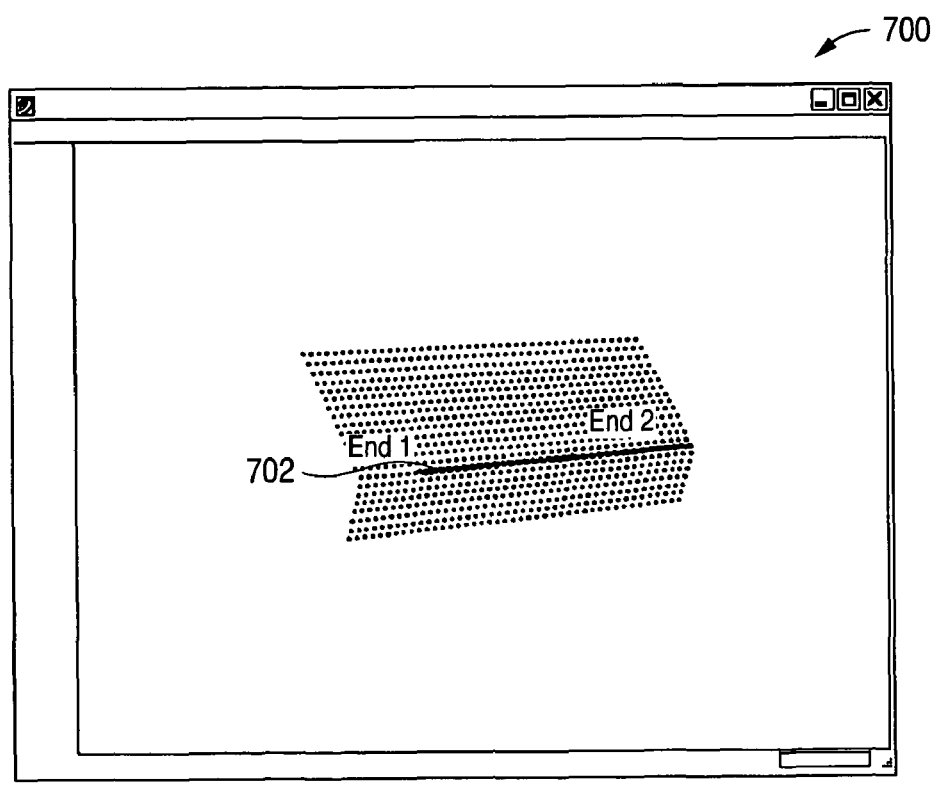
FIG. 7 is a view showing the end points of the calculated edge profile of FIG. 5 as adjusted by a user.

Over/undershoot also can occur because there often is no clear demarcation or threshold that is applicable for a particular edge type and shape that accurately defines where an edge begins or ends. In such a situation, the user can be allowed to adjust the endpoint of the edge model using a slider bar, scroll box, or other appropriate selection item as discussed above. As shown in the view 600 of FIG. 6, the first end 602 and second end 604 of the edge are displayed as determined by the fitting procedure. Using the panel of FIG. 4, the user can alter the first end position, for example, to a position 702 such as is shown in the view 700 of FIG. 7. In an alternative embodiment, the user can select an appropriate end point by dragging the end point using a cursor or selecting the appropriate end point from the point cloud.

Figure 8:
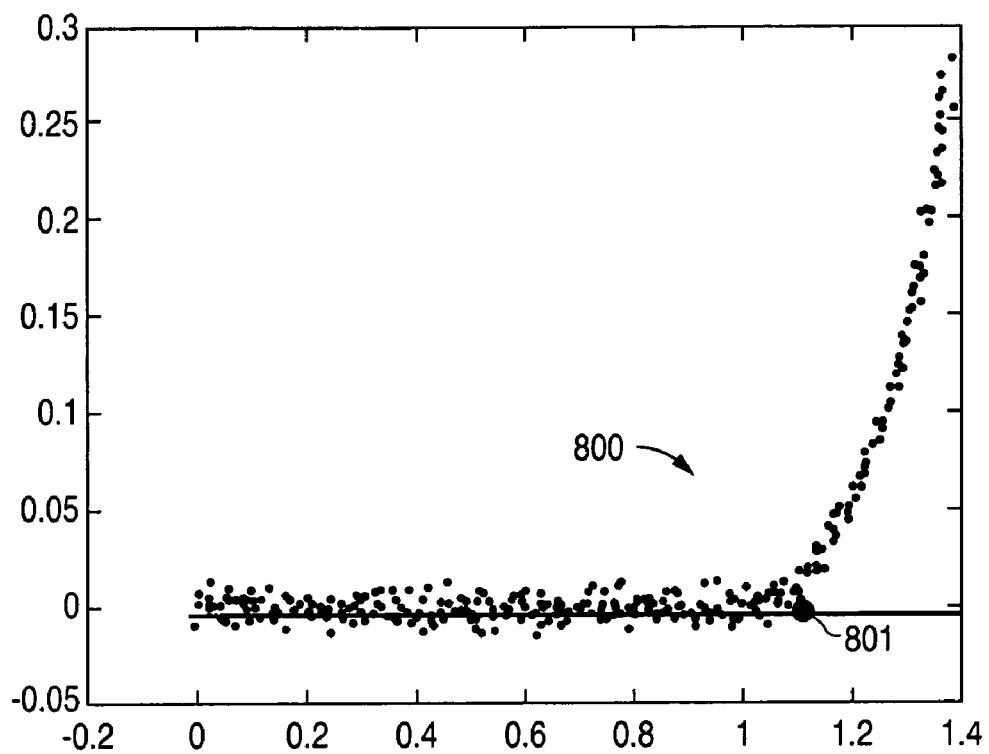
FIG. 8 shows an initial fit of points on a curve in accordance with one embodiment of the present invention.
Figure 9:
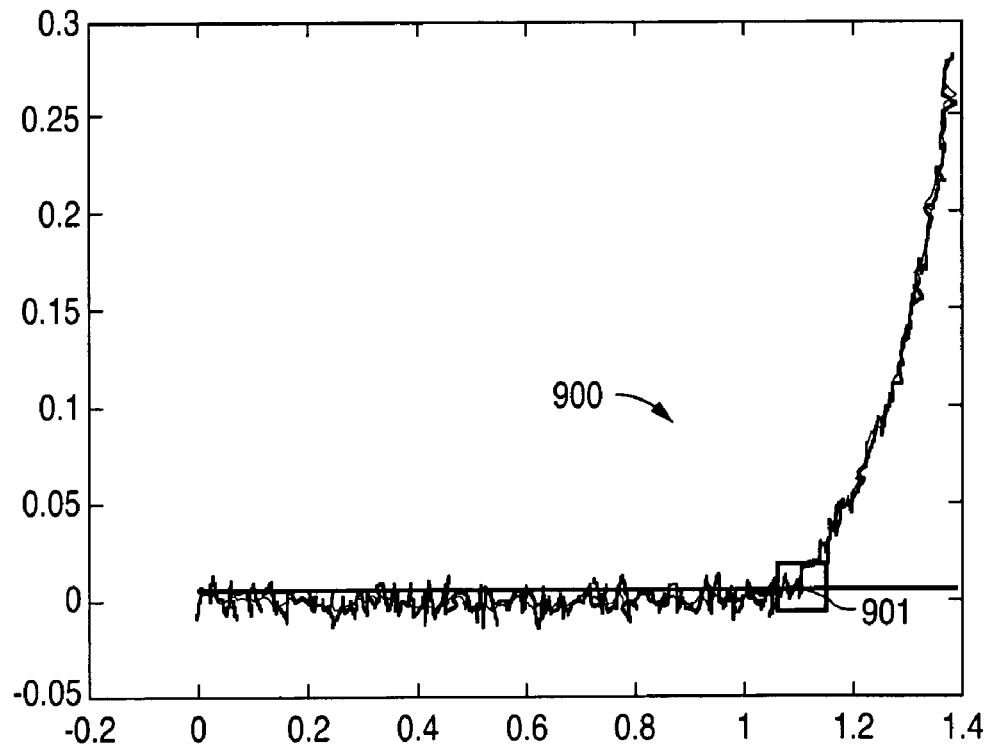
FIG. 9 shows an end point for the curve of FIG. 8 based on the divergence of the extension fit.

The processing system can attempt to determine the appropriate edge termination position using an appropriate extension algorithm. An algorithm in accordance with one embodiment determines the end of an edge by finding the point at which the edge position exceeds a given deviation threshold, such as may be determined based on the standard deviation of the edge points. Such an algorithm can start at the seed point using the edge profile as set or adjusted by the user. The algorithm then can fit the data in either direction along the edge, searching to find a segment (of any appropriate length) to which an extrusion of the edge template can be accurately fit. The algorithm then can attempt to extend that segment as far as possible while staying within the deviation threshold, such as is shown in the plot 800 of FIG. 8. The algorithm can analyze the residuals along the curve, and can use a "moving window," or fitting region, for averaging the errors along the curve. When the moving average extends beyond the deviation threshold, such as is shown in box 901 in the plot 900 of FIG. 9, the algorithm can determine the edge to end at that point (corresponding to point 801 of FIG. 8). An algorithm also can be used to adjust the fit using the moving window to break the segment into sub-segments, and fit those sub-segments to further reduce the residuals. If a least squares fit is used, errors on both sides will be equally likely such that the average should be near zero, as long as the segment is substantially linear over that region. Once the average begins to diverge significantly, an end point can be selected. The standard deviation can be a safe threshold estimate, as the error usually is some fraction of the standard deviation. Further, for each segment the algorithm can use the end point of that segment as a starting point in an attempt to fit another segment, in an attempt to extend the edge. The use of a moving average also allows the algorithm to work even in the presence of gaps and outliers in the data. The size and use of the window can be user configurable as would be understood to one of ordinary skill in the art. The window also can change parameters or tolerances, such as when the points become sparse, and can utilize a "learning" ability to adjust the size. Initially, the size of the window can be proportional to the scale used, as set or adjusted by the user.

Although embodiments of the present invention are described with respect to scan data of architectural objects, advantages of a three-dimensional modeling system can be obtained for a wide variety of other applications and systems. The data need not be obtained from scanning, but can be captured from any of a number of three-dimensional measurement or detection techniques. The data also can be generated using software or other data generation means.

When used with construction, design, or building applications, the embodiments discussed herein can be used to identify and model a number of different objects, which can include objects such as: runs of pipe (including elbows, tees, flanges, reducers, valves); roads; road curbs; center dividers; guard rails; utility poles (including common scale, orientation, and spacing); utility lines; parking meters (including common scale and orientation, as well as relation to curb); lamp posts; fence posts; tunnels; rail tracks and ties; structural steel; bolts and connectors; walls, floors, and ceilings (including doors and windows); HVAC ducts (including variable dimension/proportion cross section); conduit (where building codes specify bend and connector parameters); wiring; stairs; ladders; hand rails; architectural columns; planks in wooden boats; spheres (such as registration targets, storage tanks); boxes; surfaces made up of a small number of components with known connections; and surfaces comprised of repeating units (that may not be connected in the normal sense).

It should be recognized that a number of variations of the above-identified embodiments will be obvious to one of ordinary skill in the art in view of the foregoing description. Accordingly, the invention is not to be limited by those specific embodiments and methods of the present invention shown and described herein. Rather, the scope of the invention is to be defined by the following claims and their equivalents.

What is claimed is:

1. A method in a computer system for fitting an edge to data points contained in a point cloud, comprising the steps of:
    displaying a view of at least a portion of the point cloud to a user, the view being aligned along a predicted direction of the edge, the edge being defined by points of the point cloud along a surface profile shape that extends over a distance;
    receiving from the user a seed point selected from the data points contained in the point cloud that lies near the edge; and
    automatically generating and displaying an initial edge profile for the edge based on the seed point and adjacent points in the point cloud, the initial edge profile being fit to the points in the point cloud, wherein the step of automatically generating and displaying an initial edge profile includes:
        receiving the seed point selected from the data points contained in the point cloud that is indicated to lie near the edge;
        generating a covariance matrix using adjacent points near the seed point in the point cloud;
        calculating the eigenvectors of the covariance matrix;
        using the eigenvectors to determine a direction of extension of the edge; and
        displaying points near the seed point in a view that corresponds to a cross-section of the edge near the seed point.

2. A method according to claim 1, further comprising:
adjusting the initial edge profile in response to user input to more closely match the adjacent points in the point cloud.

3. A method according to claim 1, further comprising:
adjusting a region of interest about the seed point in order to generate and display the initial edge profile based on the seed point and the adjacent points in the region of interest.

4. A method according to claim 1, further comprising:
receiving an approval from the user for the initial edge profile to be used in finding the edge.

5. A method according to claim 1, wherein:
the predicted direction of edge is based on local analysis of the geometric distribution of the data points.

6. A method according to claim 1, further comprising:
generating a calculated edge fit to the data points in the point cloud.

7. A method according to claim 6, further comprising:
displaying the calculated edge to the user.

8. A method according to claim 7, further comprising:
allowing the user to insert vertices along the calculated edge at an interval selected by the user.

9. A method according go claim 8, wherein:
the interval corresponds to points where the fit edge crosses a predefined grid.

10. A method according to claim 6, wherein:
the calculated edge includes first and second end points that are adjustable along the calculated edge based on user input.

11. A method according to claim 6, further comprising:
extending the calculated edge as far as possible while staying within a deviation threshold.

12. A method according to claim 11, further comprising:
adjusting a resolution in order to assist in extending the calculated edge.

13. A method according to claim 1, further comprising:
aligning the displayed view of at least a portion of the point cloud along a predicted direction of the edge.

14. A method according to claim 13, wherein:
the predicted direction of edge is based on local analysis of the geometric distribution of the data points.

15. A method in a computer system for fitting an edge to data points contained in a point cloud, comprising the steps of:
    displaying a view of at least a portion of the point cloud to a user, the view being aligned along a predicted direction of the edge, the edge being defined by points of the point cloud along a surface profile shape that extends over a distance;
    receiving from the user a seed point selected from the data points contained in the point cloud that lies near the edge; and
    automatically generating and displaying an initial edge profile for the edge based on the seed point and adjacent points in the point cloud, the initial edge profile being fit to the points in the point cloud, wherein the step of automatically generating and displaying an initial edge profile includes:

receiving a seed point selected from the data points contained in the point cloud that is indicated by a user to lie near the edge;

generating a covariance matrix using adjacent points near the seed point in the point cloud;

calculating the eigenvectors of the covariance matrix; and using the eigenvectors to determine a direction of extension of the edge.

16. A method according to claim 15, wherein:

the step of using the eigenvectors includes using the smallest eigenvector as the normal direction of the edge.

17. A method according to claim 15, further comprising:

determining first and second line segments having an acceptable fit to the adjacent points orthogonal to the direction of extension.

18. A method according to claim 15, further comprising:

extending the first and second line segments to determine whether the extended first and second line segments intersect adjacent the seed point, the first and second line segments forming the initial edge profile when intersecting near the seed point.

19. A method according to claim 15, further comprising:

using the covariance matrix and the direction of extension to determine a shape of the edge.

20. A method in a computer system for adjusting an edge fit to data points contained in a point cloud, comprising the steps of:

displaying a view of at least a portion of the point cloud to the user;

calculating an edge fit to the data points in the point cloud, the calculated edge including first and second end points, wherein the step of calculating the edge includes using the eigenvectors to determine a direction of extension of the edge and using the covariance matrix and the direction of extension to determine a shape of the edge; and if the edge fit undershoots or overshoots a true end of the calculated edge, receiving user input defining the location of the first and second end points along the calculated edge.

21. The method according to claim 20, further comprising displaying the calculated edge fit to the data points in the point cloud.

22. The method according to claim 20, further comprising inserting vertices along the calculated edge at an interval selected by the user.

23. A method in a computer system for fitting an edge to data points contained in a point cloud, the point cloud including a three dimensional model of a scene including three dimensional points defining a surface of an object, the method comprising the steps of:

displaying a view of at least a portion of the point cloud to a user including the three dimensional points defining the surface of the object, the view being aligned along a predicted direction of the edge, the edge being defined by points of the point cloud along a surface profile shape that extends over a distance of the surface of the object;

receiving from the user a seed point selected from the data points contained in the point cloud that is deemed by the user to lie on or near the edge;

automatically generating an initial edge profile for the edge based on the seed point and a spatial query of points in a region of space near the seed point and determining a likely direction of extension of the edge, wherein the step of automatically generating an initial edge profile includes:

generating a covariance matrix using adjacent points near the seed point in the point cloud;

calculating the eigenvectors of the covariance matrix; and using the eigenvectors to determine a direction of extension of the edge;

displaying the initial edge profile to the user; and adjusting the initial profile based on input received from the user.

* * * * *